United States Patent
Speckman (10) Patent No.: US 12,448,733 B2
(45) Date of Patent: Oct. 21, 2025

(54) METHODS, DEVICES, AND SYSTEMS FOR SEAL STRIP ZONE MODULE STRIP POSITION DETERMINATION

(71) Applicant: Stowe Woodward Licensco LLC, Youngsville, NC (US)

(72) Inventor: Jacob Speckman, Neenah, WI (US)

(73) Assignee: STOWE WOODWARD LICENSCO LLC, Youngsville, NC (US)

( * ) Notice: Subject to any disclaimer, the term of this patent is extended or adjusted under 35 U.S.C. 154(b) by 194 days.

(21) Appl. No.: 18/347,943

(22) Filed: Jul. 6, 2023

(65) Prior Publication Data
US 2025/0012012 A1    Jan. 9, 2025

(51) Int. Cl.
| | |
|---|---|
| D21G 9/00 | (2006.01) |
| B31B 70/00 | (2017.01) |
| D21F 1/40 | (2006.01) |
| D21F 1/50 | (2006.01) |
| D21F 3/04 | (2006.01) |
| D21F 3/10 | (2006.01) |

(52) U.S. Cl.
CPC .............. D21F 3/10 (2013.01); B31B 70/006 (2017.08); D21F 1/40 (2013.01); D21F 1/50 (2013.01); D21F 3/04 (2013.01); D21G 9/0036 (2013.01); D21G 9/0045 (2013.01)

(58) Field of Classification Search
CPC .. D21G 9/0009; D21G 9/0036; D21G 9/0045; D21F 1/36; D21F 1/40; D21F 1/48; D21F 1/50; D21F 3/02; D21F 3/10; D21F 3/04
See application file for complete search history.

(56) References Cited

U.S. PATENT DOCUMENTS

| | | | |
|---|---|---|---|
| 2005/0126732 A1 | 6/2005 | Gleason | |
| 2005/0219865 A1* | 10/2005 | Vogman | H02M 3/33569 363/16 |
| 2021/0087747 A1 | 3/2021 | Erkelenz | |
| 2022/0145538 A1* | 5/2022 | Kilbourne | D21F 3/10 |
| 2022/0333306 A1 | 10/2022 | Erkelenz | |

FOREIGN PATENT DOCUMENTS

EP    3623526 A1    3/2020

OTHER PUBLICATIONS

Notification of Transmittal of the International Search Report and the Written Opinion of the International Searching Authority, or the Declaration, in corresponding PCT Application No. PCT/US2024/032470 (Sep. 13, 2024).

* cited by examiner

Primary Examiner — Douglas X Rodriguez
Assistant Examiner — Kendrick X Liu
(74) Attorney, Agent, or Firm — Myers Bigel, P.A.

(57) ABSTRACT

An electronic device for determining a location of a seal strip device in a strip of a papermaking machine includes a seal strip location identification component associated with the seal strip device, a current monitoring circuit configured to measure a current through the seal strip location identification component that is associated with the seal strip device, and a location circuit configured to transmit information related to the current through the seal strip location identification component, and configured to receive an address related to the location of the seal strip device. Related methods and systems are also described.

19 Claims, 9 Drawing Sheets

METHODS, DEVICES, AND SYSTEMS FOR SEAL STRIP ZONE MODULE STRIP POSITION DETERMINATION

FIELD

Various embodiments described herein relate to paper machine suction roll devices, and more specifically to seal strip temperature and wear sensors installed into a seal strip that is used in connection with rollers such as those used in papermaking, steel making, plastics calendering, and/or printing machines.

BACKGROUND

Suction rollers, also referred to as nipped rolls or pinch rolls, are used in a vast number of continuous process industries including papermaking, steel making, plastics calendering, and/or printing. Suction rollers are used to press two or more sheets of a material together. The characteristics of suction rollers are particularly important in papermaking. Two or more suction rollers may press together, exerting force on the paper or types of sheets therebetween. Various sensors may be used to monitor the pressure, temperature, wear, or other characteristics of the suction rollers during operation. The sensors may include a seal strip temperature and wear sensor, sometimes referred to as a zone module, and is installed into a seal strip before power is available to the system. The seal strips inside a suction roll are not visible to the operator of the equipment.

SUMMARY

Various embodiments of the present inventive concepts are directed to an electronic device for determining a location of a seal strip device in a strip of a papermaking machine. The electronic device includes a seal strip location identification component associated with the seal strip device, a current monitoring circuit configured to measure a current through the seal strip location identification component that may be associated with the seal strip device, and a location circuit configured to transmit information related to the current through the seal strip location identification component, and configured to receive an address related to the location of the seal strip device.

According to some embodiments, location circuit may include a transceiver configured to transmit the information related to the current through the seal strip location identification component to a system coordinator circuit, and configured to receive the address related to the location of the seal strip device from the system coordinator circuit. The electronic device may further include a common bus that may be electrically connected to the seal strip location identification component. The common bus may be electrically separate from a power bus of the strip. The information related to the current through the seal strip location identification component may be communicated to the system coordinator circuit via the common bus.

According to some embodiments, the current monitoring circuit includes a differential monitoring circuit configured to determine a voltage differential across the seal strip location identification component. The seal strip location identification component may include a passive electrical component. The passive electrical component may be a resistor. The location of the seal strip device may be configured to be programmed at installation of the strip of the papermaking machine. The location of the seal strip device may be based on a value of the seal strip location identification component. The seal strip location identification component may include an active microcontroller that includes an input configured to receive state information indicating the address related to the seal strip device and an output that may be toggled to control addressing of another active microcontroller.

According to some embodiments, the seal strip device includes a first seal strip device of a plurality of seal strip devices, and the seal strip location identification component includes a first seal strip location identification component of a plurality of seal strip location identification components. Respective ones of the seal strip location identification components have different values from one another to indicate unique respective locations of respective seal strip devices includes the seal strip device in the strip. The seal strip location identification components associated with the respective seal strip devices are electrically connected in series. Respective location circuits that include the location circuit are associated with the respective seal strip devices and are configured to transmit information related to respective currents through respective ones of the seal strip location identification components to a system coordinator circuit. The respective location circuits are configured to receive respective addresses from the system coordinator circuit related to respective locations of the respective seal strip devices.

According to some embodiments, the electronic device further includes a common bus that may be electrically connected to ones of the seal strip location identification components. The common bus may be electrically separate from a power bus of the strip. The information related to the current through the seal strip location identification components may be communicated to the system coordinator circuit via the common bus. At power-up the first seal strip device may be assigned a first address and then triggers a second seal strip device to obtain a second address.

Various embodiments of the present inventive concepts are directed to a method for determining a location of a seal strip device in a strip of a papermaking machine. The method includes determining a current through a seal strip location identification component associated with the seal strip device, reporting the current through the seal strip location identification component to a system coordinator device, receiving, from the system coordinator device, an address related to the location of the seal strip device, and determining the location of the seal strip device based on the address that was received from the system coordinator device.

According to some embodiments, the seal strip device includes a first seal strip device of a plurality of seal strip devices, and the seal strip location identification component includes a first seal strip location identification component of a plurality of seal strip location identification components. Respective ones of the seal strip location identification components may have different values from another to indicate unique respective locations of respective seal strip devices includes the seal strip device in the strip. In some embodiments, the method may further include, at power-up, assigning a first address to the first seal strip device and then triggering a second seal strip device to obtain a second address.

According to some embodiments, the seal strip location identification components associated with the respective seal strip devices are electrically connected in series. The respective location circuits are associated with the respective seal strip devices. The method further includes transmitting information related to respective currents through respective ones of the seal strip location identification components to a system coordinator circuit, and receiving, by the respective location circuits, respective addresses from the system coordinator circuit related to respective locations of the respective seal strip devices.

Various embodiments of the present inventive concepts are directed to a seal strip location determination circuit for determining a location of a seal strip device in a strip of a papermaking machine. The seal strip location determination circuit includes a seal strip identification circuit associated with the seal strip device, a current monitoring circuit configured to determine a current through the seal strip identification circuit that may be associated with the seal strip device, and a location circuit configured to transmit information related to the current through the seal strip identification circuit, and configured to receive an address related to the location of the seal strip device.

It is noted that aspects of the inventive concepts described with respect to one embodiment, may be incorporated in a different embodiment although not specifically described relative thereto. That is, all embodiments and/or features of any embodiment can be combined in any way and/or combination. Other operations according to any of the embodiments described herein may also be performed. These and other aspects of the inventive concepts are described in detail in the specification set forth below.

BRIEF DESCRIPTION OF THE DRAWINGS

The accompanying drawings are included to provide a further understanding of the present disclosure and are incorporated in and constitute a part of this application. These drawings illustrate certain example embodiments. In the drawings.

DETAILED DESCRIPTION

Various embodiments will be described more fully hereinafter with reference to the accompanying drawings. Other embodiments may take many different forms and should not be construed as limited to the embodiments set forth herein. Like numbers refer to like elements throughout.

Seal strip sensors, also referred to as sensors, may be placed on suction rollers to monitor operational parameters of the seal strip such as pressure, temperature, wear, loading, deflection, size, rotational direction, rotational speed, and/or other characteristics. The sensors may be part of a measuring device that discerns these various operational parameters from the sensors and sends to a processor, hardware, software, firmware, and/or a user interface. The measuring device may need to be calibrated in order to sense the parameters of the sensors properly. The seal strip temperature and wear sensor, sometimes referred to as a zone module, is installed into a seal strip before power is available to the system. After installation, the strips will be sealed in their location within a suction roll so access to each board will be limited, if available at all. Each zone module needs to be correlated to a location on the seal strip.

Various embodiments of the present inventive concepts arise from the recognition of a need to correlate a zone module to a location in the seal strip without physical access. The zone modules are connected in a series configuration in each seal strip. Each successive zone module in the series may modify the state of this shared bus. If each zone module monitors this bus, the changes sensed at each zone module will vary depending on where they are in the seal strip.

Figure 1:
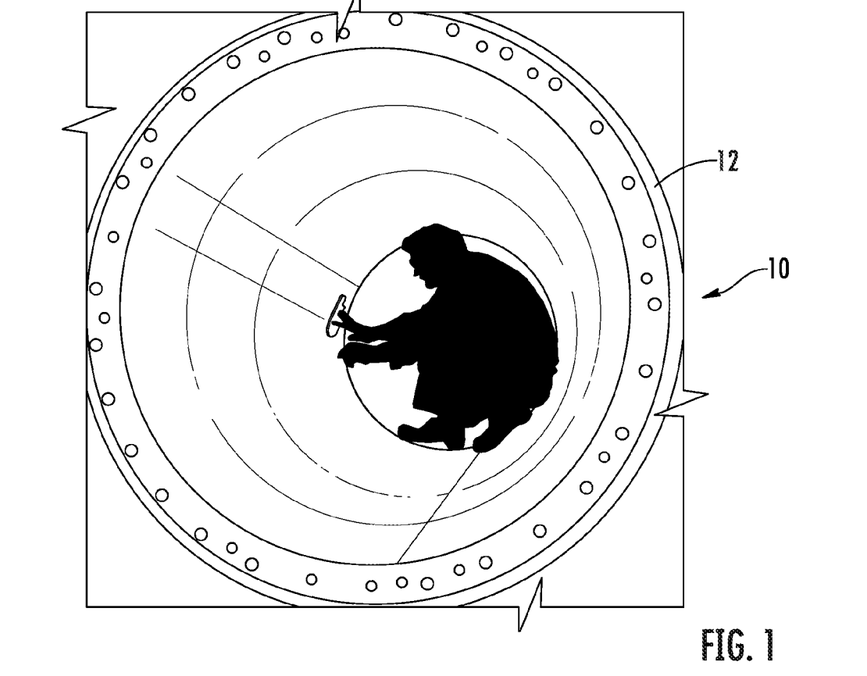
FIG. 1 is a perspective end view of a typical paper machine suction roll, according to various embodiments described herein.

FIG. 1 is a perspective end view of a typical paper machine suction roll, according to various embodiments described herein. Referring to FIG. 1, the main component of a suction roll 10 includes a hollow shell 12 made of stainless steel, bronze or other metal that has tens of thousands of holes, drilled in a prescribed pattern radially around the circumference of the roll. These holes are gauged in size (ranging from under ⅛" to nearly ¼") and are engineered for the particular paper material to be processed. It is these holes that form the "venting" for water removal. This venting can typically range from approximately 20 to 45 percent of the active roll surface area. The suction roll shell is driven by a drive system that rotates the shell around a stationary core called a suction box.

The suction box 20 (FIG. 2) can be thought of as conventional long rectangular box without a lid on the top and with ports on the end, bottom or sides. The end (specifically the drive end) of the box typically has a pilot bearing, of which the inner raceway is a pilot bushing or bearing with a slip fit to a journal on the suction box and the outer raceway is pressed onto the rotating shell. The suction box 20 is connected with a suction source (e.g., a vacuum pump). An example suction box and shell are shown in U.S. Pat. No. 6,358,370 to Huttunen, the disclosure of which is hereby incorporated herein in its entirety.

Figure 2:
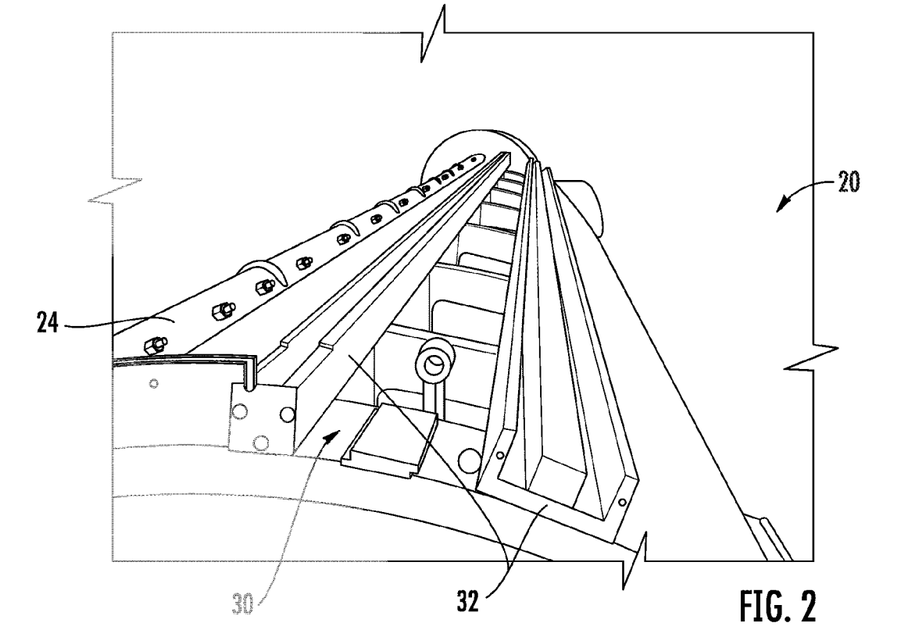
FIG. 2 is an enlarged perspective end view of the suction box area of a typical suction roll, according to various embodiments described herein.
Figure 3:
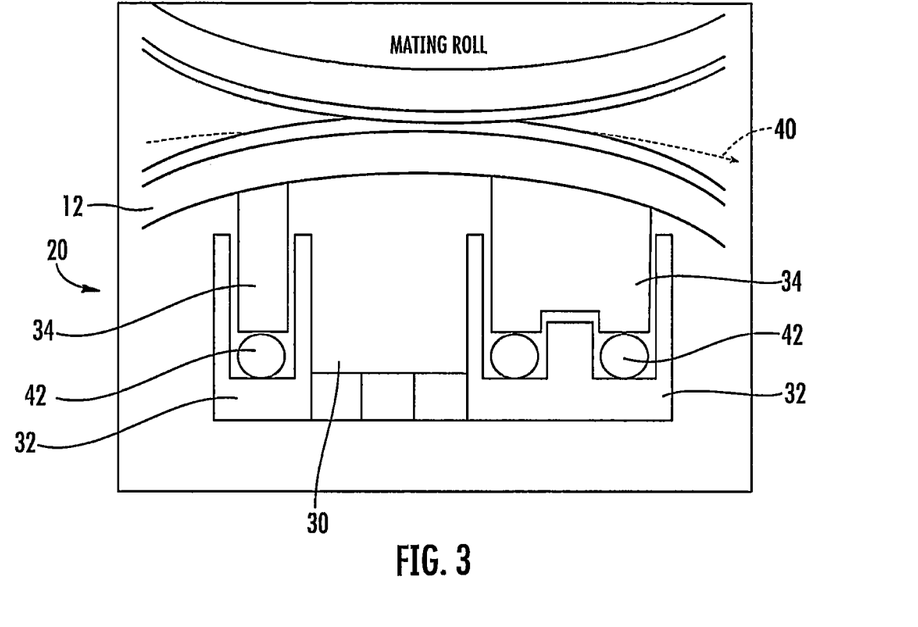
FIG. 3 is an end view of the suction box area and seal strips of a suction roller, according to various embodiments described herein.

In order to take advantage of the holes in the shell, a vacuum zone 30 must be created using these ports on the inside of the suction roll shell in a zone that is directly underneath the paper pulp that is being processed. This is accomplished by the suction box 20 using a slotted holder 32 which holds a seal along the long axis of the suction box on both sides. FIG. 2 shows the slotted holders 32, and FIG. 3 shows varieties of seals 34 which are in the form of strips (hereinafter "seal strips"). In addition to these long seals there are two shorter seals (called end deckles) on the short ends (called tending and drive ends) that permit some axial adjustment as needed to accommodate various sheet widths.

The seal strips 34 are usually made of rubberized polymerized graphite and are held nearly in contact with the inner surface of the shell 12 during operation (see FIG. 3). Between the seal strips 34 a constant vacuum is drawn. This allows the vacuum zone 30 to be created underneath the sheet 40 as is passes over the suction roll 10. The seal strips 34 are biased upwardly toward the suction roll shell 12 by load tubes 42, which are sealed hoses that run underneath the entire length of the seal strip 34. Pressure in the load tube 42 expands the load tube 42 (much like air in a balloon) and lifts the seal strip 34 toward the inside surface of the shell 12. This effect, along with help from the system vacuum from the suction box 20 and the laminar flow of lubrication water mentioned previously, forms the seal between the edge of the seal strip 34 and the inside of the shell 12.

In actual application, in a properly functioning suction roll the seal strips 34 never directly contact the inside of the suction roll shell 12. If the seal strips 34 were to contact the shell 12 they would wear away and would quickly lose their sealing ability. In order to eliminate or significantly reduce this wear and to provide a seal, water is applied along the length of the seal strips 34 with a lubrication shower formed with water flowing through a spray nozzle 24 (see FIG. 2). This shower keeps the seal strips 34 lubricated with a laminar flow of water between the seal surface and the inside surface of the shell 12.

The amount of water used for lubrication should be gauged properly so that the proper amount of lubrication is applied to keep the seal strips 34 lubricated, but not so much to either become an issue for the pulp being processed or to be wasting water. In addition, process water used in a paper mill may contain chemicals and also significant particulates that may clog the lubrication shower nozzles 24 during normal operation. Since these nozzles 24 are located inside the rotating shell 12 they are not visible to the paper machine operator.

Seal strips are typically replaced periodically after some degree of wear occurs. However, because the seal strips inside a suction roll are not visible to the operator of the paper making equipment or to anyone trying to view the seal strips, many conditions inside an operating suction roll, including the degree of seal strip wear, are unknown. As such, reliable methods of detecting seal strip wear have been developed to inform the operator of the paper making equipment that maintenance is needed on the equipment before a failure occurs may be desirable. However, since the seal strips are at various positions on the suction roll, a need exists to correlate a zone module that has been installed into a location in the seal strip without physical access to the zone module. The zone modules in the seal strips may be connected in a series configuration in each seal strip. Each successive zone module in the series may modify the state of a shared bus to which the various zone modules are connected. Each zone module may monitor this common bus, and the changes sensed at each zone module may vary depending on where they are in the seal strip.

Figure 4:
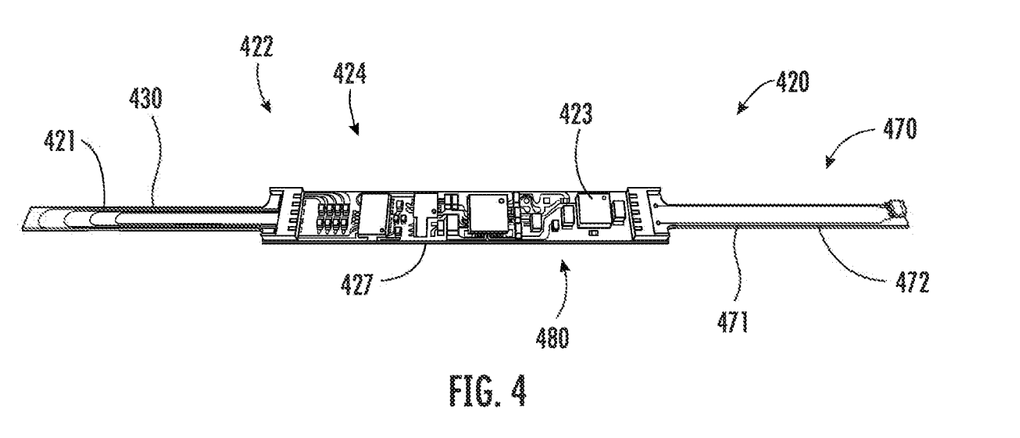
FIG. 4 is a plan view of a seal strip monitoring system, according to various embodiments described herein.

FIG. 4 illustrates another wear monitoring system, designated broadly at 420. The wear monitoring system 420 is mounted on a single PCB 423 (i.e., both the sensing portion 422 and the signal processing portion 424 are located on the same PCB 423). As such, there are no cables; instead, the traces 430 are connected directly to the components of the signal processing portion 424. The PCB 423 is flexible, enabling it to be bent so that the finger 421 on which the sensing portion 422 is mounted can be oriented generally perpendicularly to the main portion 427 of the PCB 423. Any of the wear monitoring systems 120, 220, 320 described above may be mounted on the PCB 423.

In some embodiments, a temperature monitoring system 470 is also mounted on the PCB 423. The temperature monitoring system 470 may take many forms, including that described in U.S. Provisional Patent Application No. 63/375,587, filed Sep. 14, 2022, the disclosure of which is hereby incorporated herein by reference in full. A sensing portion 472 of the temperature monitoring system 470 is mounted on finger 471 of the PCB 423, and signal processing components of the temperature monitoring system 470 are mounted on the main portion 427 of the PCB 423. Together the wear monitoring system 420 and the temperature monitoring system 470 form an overall seal strip monitoring system 480.

Figure 5A:
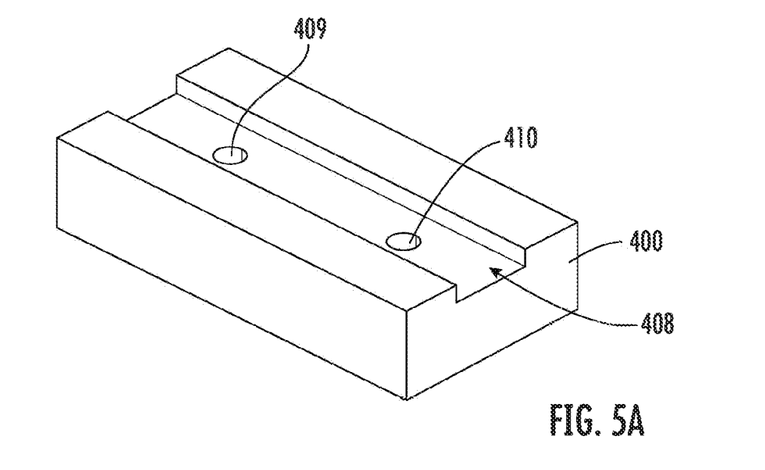
FIGS. 5A and 5B are sequential perspective views illustrating the construction of the seal strip monitoring system of FIG. 4, according to various embodiments described herein.
Figure 5B:
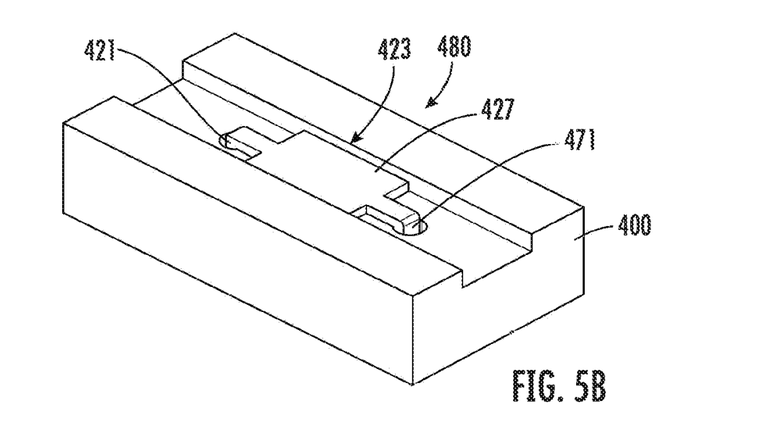

Mounting of the seal strip monitoring system 480 is illustrated in FIGS. 5A and 5B. FIG. 5A illustrates the lower surface of a seal strip 400, wherein a channel 408 has been formed and holes 409, 410 have been drilled perpendicularly to the channel 408. FIG. 5B illustrates that the system 480 is installed in the seal strip 400, with the fingers 421, 471 inserted into the holes 409, 410 to deploy the sensing portions 422, 472, and the main portion 427 of the PCB 423 mounted in the channel 408 itself. According to various embodiments described herein, the PCB 423 includes an electronic device, such as the seal strip device 600 of FIG. 6, for determining a location of a seal strip device in the seal strip of the papermaking machine.

The zone module is installed into a seal strip and then sealed (i.e., water-tight) into its location. The PCB 423 that includes the zone module would be assigned a known identifier before being sealed into its position in the seal strip. Each PCB 423 would be customized for each position on the seal strip or have a custom parameter assigned at the time of installation. In some embodiments, each PCB may be powered at installation and programmed with a strip location manually into a menu in firmware. However, this solution may be difficult as it would require the installer to learn the power up and programming process. In some embodiments, specific components may be included on the PCB 423 that correlate the particular PCB 423 to a strip location on the seal strip. For example, the seal strip location identification component may be a resistor with a resistance value that varies for each position of the seal strip.

Figure 6:
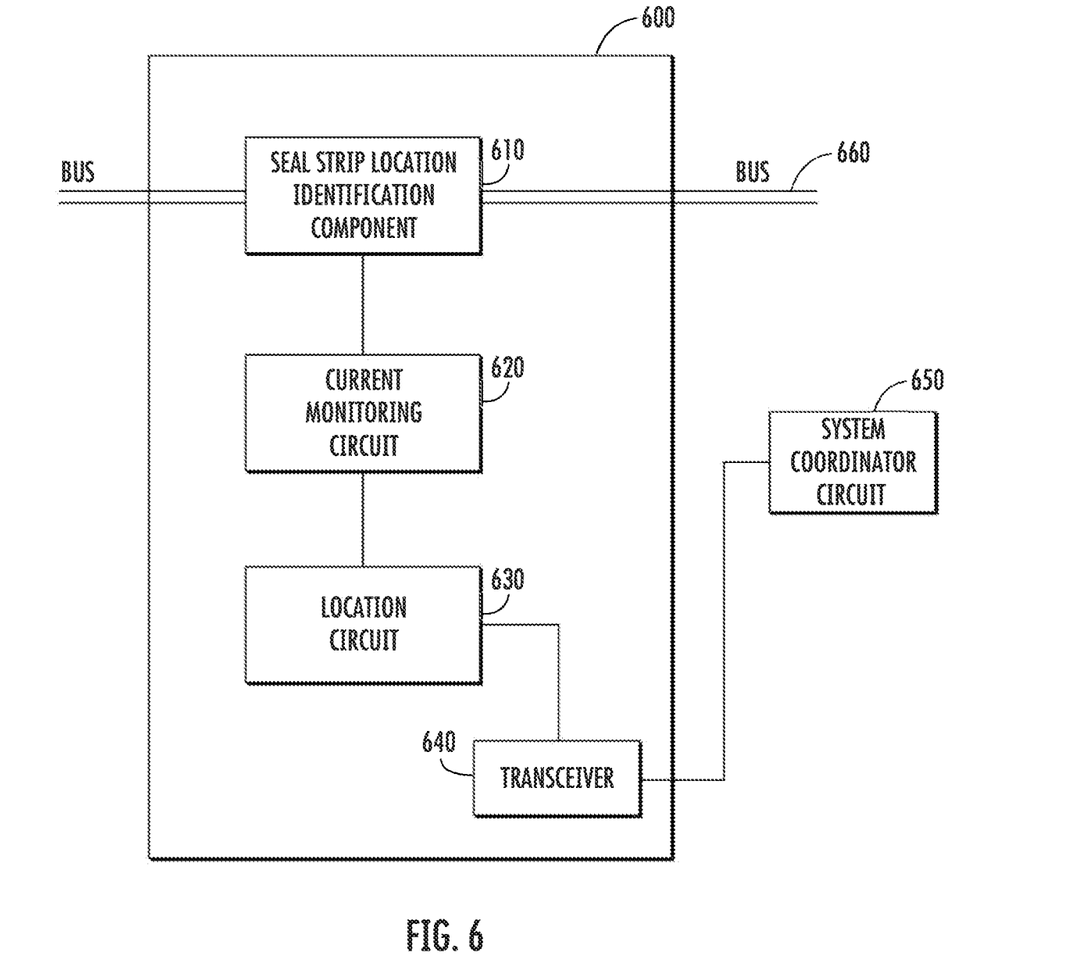
FIG. 6 is a block diagram of a seal strip monitoring system, according to various embodiments described herein.

FIG. 6 is block diagram of a seal monitoring system, according to various embodiments described herein. Referring to FIG. 6, the seal strip device 600 may include a seal strip location identification component 610, a current monitoring circuit 620, a location circuit 630, and/or a transceiver 640. The seal strip device 600 may communicate with a system coordinator circuit 650 that is external to the seal strip device 600. The seal strip device 600 may be the zone module that is in the seal strip. The seal strip location identification component 610 associated with seal strip device 600 may be a passive electrical component such as a conductive wire or a resistor. Each zone module (i.e., seal strip device 600) may introduce a known change to the power bus, since the power bus is used by all modules in series. The power bus can then be monitored at each zone module to determine how much change is seen in total. The further downstream in the series chain that the zone module is located, the more the total effect will be on the total voltage change on the power bus. Although some embodiments described herein are in the context of a zone module, the zone module is not essential to the system and other devices connected in series can be used to determine the location of the seal strip device 600 in the seal strip. The seal strip devices 600 in a seal strip may each have a seal strip location identification component 610 with a different value such that respective different voltages may be present across different ones of the seal strip location identification components 610. In some embodiments, the seal strip location identification component 610 of each of the seal strip devices 600 in the seal strip may be the same as one another, and the system coordinator circuit 650 may determine the position of a given seal strip device 600 based on the voltage at the given seal strip device 600. The seal strip location identification component 610 is connected in series to a bus 660 that is common to other seal strip devices. The modification to the bus by the seal strip location identification component 610 is important in the system since the change applied to the bus by one seal strip device 600 is used by subsequent modules to determine their locations. Monitoring of the shared bus by the current monitoring circuit 620 is important as each seal strip device 600 determines the bus state at its location.

Still referring to FIG. 6, current monitoring circuit 620 measures a current through the seal strip location identification component 610 that is associated with the seal strip device 600. The location circuit 630 transmits information related to the current through the seal strip location identification component 610 to the system coordinator circuit 650 using transceiver 640. The location circuit 630 receives an address related to the location of the seal strip device 600 in the seal strip from the system coordinator circuit 650.

Figure 7:
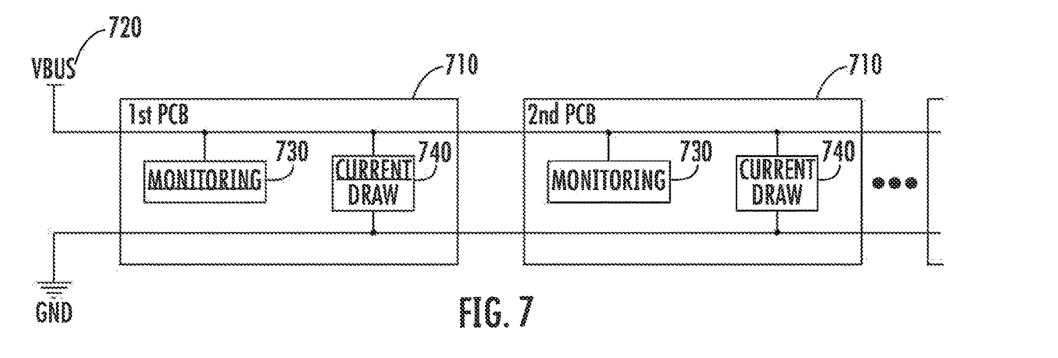
FIGS. 7, 8, 9, 10, and 11 are circuit diagrams of seal strip monitoring devices, according to various embodiments described herein.

FIGS. 7, 8, 9, 10, and 11 are circuit diagrams of seal strip monitoring devices, according to various embodiments described herein. Referring to FIG. 7, a circuit diagram of a simple implementation of the inventive concepts described herein is provided where the power bus 720 is connected in series through PCBs 710 that include the seal strip devices in a seal strip. The wiring of the power bus 720 has inherent resistance such that current may be monitored at various PCBs 710. Different PCBs 710 on power bus 720 will see different resistance to the power source on the power bus 720, based on a distance (i.e., length of the wiring) from the power bus 720. The current monitoring circuit 740, which may correspond to the current monitoring circuit 620 of FIG. 6, measures the current on the power bus 720 at PCB 710. The location monitoring circuit 730, which may correspond to the location circuit 630 of FIG. 6, transmits information related to the current to a system coordinator and/or may receive an address related to the location of the PCB 710 on the seal strip from the system coordinator.

Figure 8:
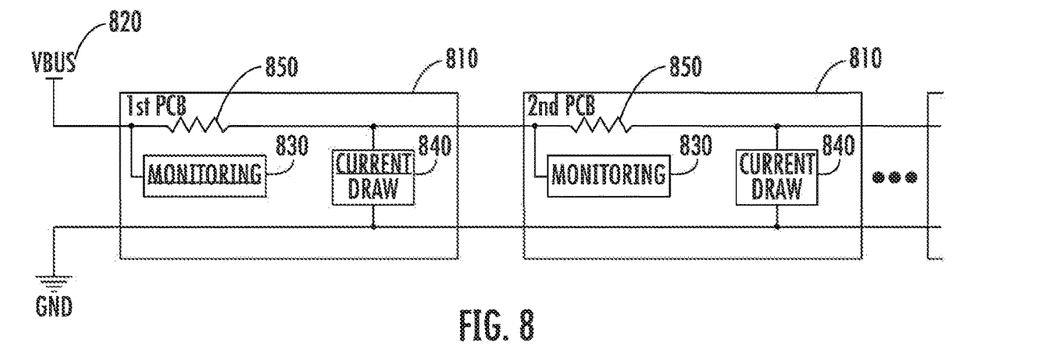

Referring to FIG. 8, a circuit diagram of some embodiments of the inventive concepts described herein is provided where each PCB 810 has a current sense resistor 850 on the power trace of power bus 820. Each PCB 810 will draw current through resistor 850 to power the PCB 810. This current will be monitored by the current monitoring circuit 840. At the first PCB 810 in the series closest to the power source of the power bus 820, the current will be highest. Successive PCBs 810 in the series chain will measure less current due to a smaller number of PCBs 810 left in the series that are drawing current. A location monitoring circuit 830 of each PCB 810 will report the current measured to the system coordinator. The system coordinator will assign the PCBs 810 a particular address that are correlated to its position in the strip.

Figure 9:
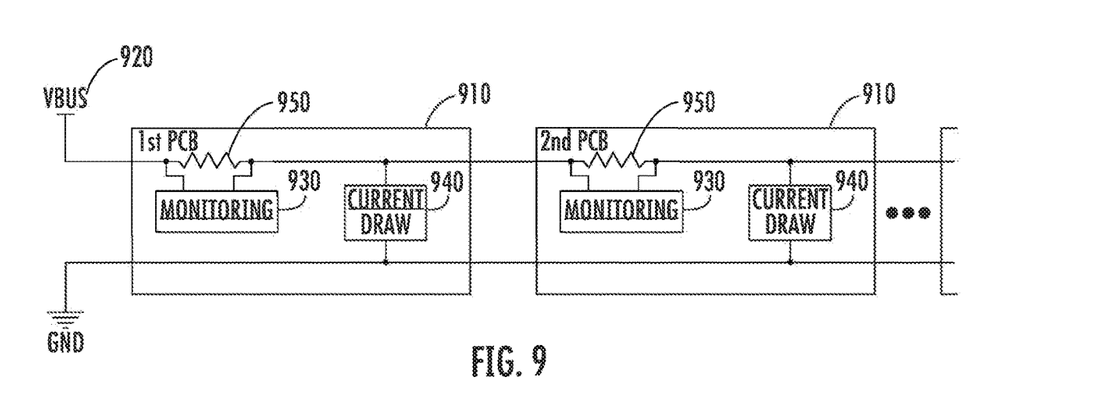

Referring to FIG. 9, a circuit diagram of some embodiments of the inventive concepts described herein is provided where monitoring is accomplished by measuring a differential of the voltage across resistor 950. Resistor 950 is connected in series on the power bus 920. The monitoring circuit 930 may measure a differential of the voltage across resistor 950. Using the differential voltage across resistor 950 provides greater accuracy such that the location of a seal strip with elevated temperature or significant wear may be identified within a window of a few inches. In this circuit configuration, a separate communication bus (not shown) may be used to communicate with a system coordinator regarding the address that is assigned to the PCB 910 in the seal strip, and to communicate temperature, wear, and other characteristics of the seal strip device. The current that is drawn may be measured by the current draw circuit 940.

Figure 10:
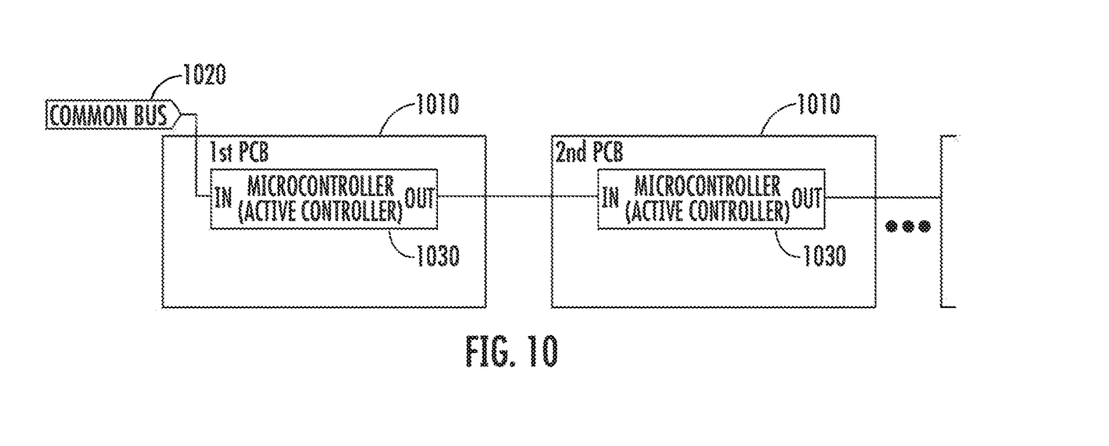

Referring to FIG. 10, a circuit diagram of some embodiments of the inventive concepts described herein is provided where the passive components are removed and would use the main micro-controller (or other "active component"). This solution would include a separate input and output on an active component to connect to the common bus 1020. The first PCB 1010 recognizes that the input is in a particular state, and would be designated as first in the string of seal strip devices. The first PCB device 1010 then toggles its output to the same particular state, which indicates to the next PCB 1010 in the series that it is assigned the next address. This solution thus provides addresses for all of the seal strip devices on the seal strip.

Figure 11:
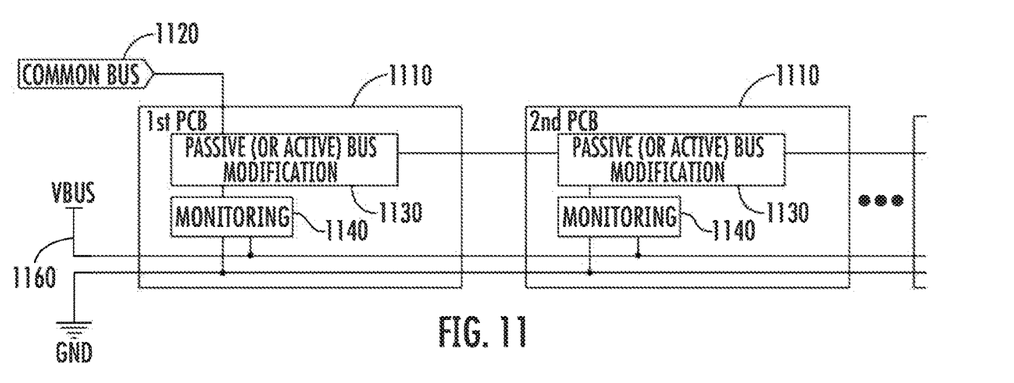

Referring to FIG. 11, a circuit diagram of some embodiments of the inventive concepts described herein is provided where a separate common bus 1120 is used to connect the various PCBs 1110 along the seal strip. The passive or active bus modification element 1130 may correspond to the seal strip location identification component 610 of FIG. 6. The passive or active bus modification element 1130 may include resistors, capacitors, and/or inductors. Successive PCBs 1110 in the seal strip may report values such as the resistance, capacitance, and/or inductance measured with respect to ground to the system coordinator. The passive or active bus modification element 1130 may be advantageous since voltage is not dropped across a resistor such as in embodiments related to FIG. 8 and FIG. 9. A location monitoring circuit 1140 of each PCB 1110 will communicate with the system coordinator in order to obtain the location information using a separate bus 1160, which serves as both a power bus and the communication bus, but is separate from the common bus 1120 that is used to connect the PCBs 1110 together. The system coordinator will assign the PCBs 1110 a certain address that are correlated to its position in the strip. Upon power-up, the location monitoring circuit 1140 of the first PCB 1110 is assigned as a first location by the system coordinator based on communication using the location monitoring circuit 1140 over the power bus 1160. The passive or active bus modification element 1130 of the first PCB 1110 then triggers the passive or active bus modification element 1130 of the second PCB 1110, which then communicates with the system coordinator and is then assigned as the second location. The second PCB 1110 then triggers a subsequent PCB 1110 in the chain, etc. Thus, the locations of all of the PCBs in the seal strip are determined without the additional power loss incurred by the resistors 850 and 950 of FIG. 8 and FIG. 9, respectively.

Figure 12:
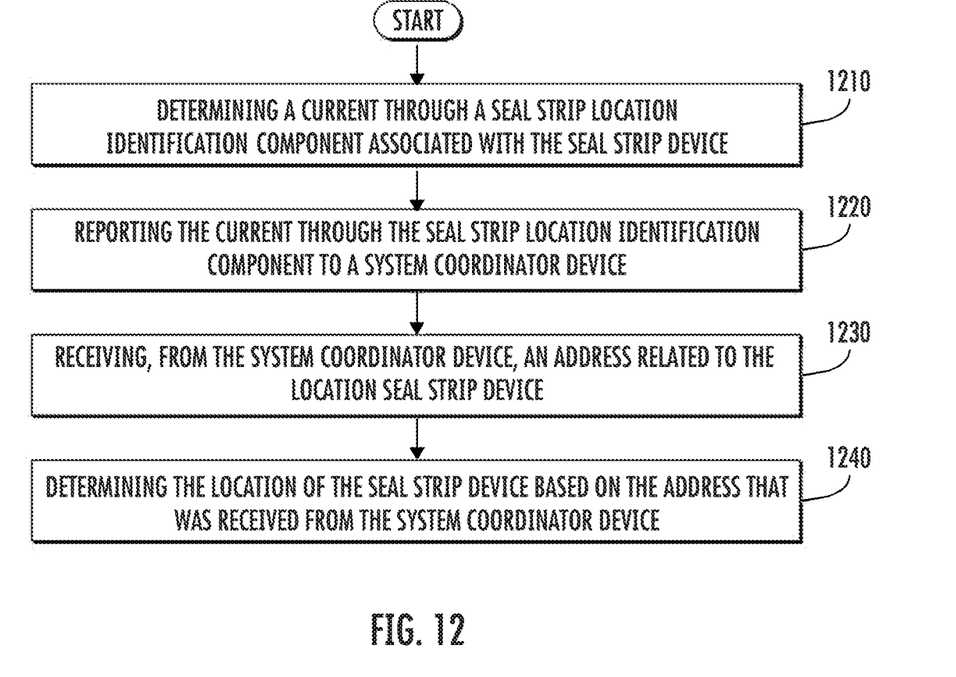
FIGS. 12, 13, and 14 are flowcharts of operations for seal strip monitoring devices, according to various embodiments described herein.
Figure 13:
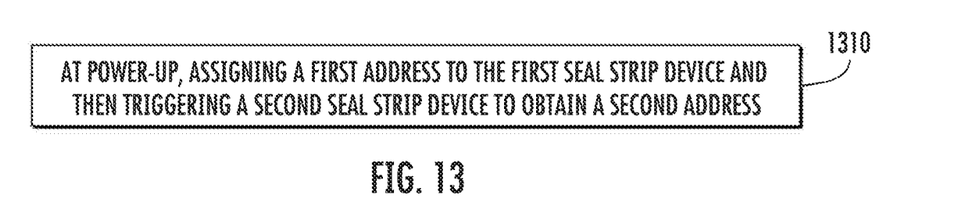
Figure 14:
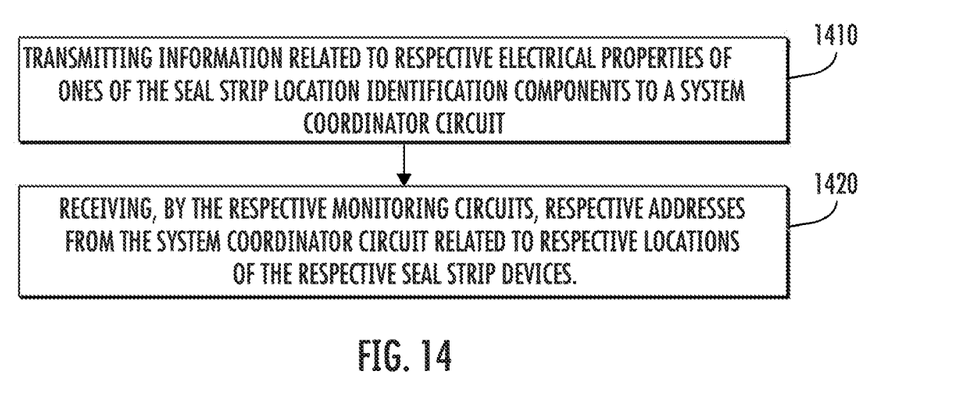

FIGS. 12, 13, and 14 are flowcharts of operations for seal strip monitoring devices, according to various embodiments described herein. Referring to FIG. 12, the operations may include determining a current through a seal strip location identification component associated with the seal strip device, at block 1210. The operations may include reporting the current through the seal strip location identification component to a system coordinator device, at block 1220. The operations may include receiving, from the system coordinator device, an address related to the location of the seal strip device, at block 1230. The operations may include determining the location of the seal strip device based on the address that was received from the system coordinator device, at block 1240. The seal strip device may include a first seal strip device of a plurality of seal strip devices, and the seal strip location identification component may include a first seal strip location identification component of a plurality of seal strip location identification components. Respective ones of the seal strip location identification components may have different values from another to indicate unique respective locations of respective seal strip devices.

Referring to FIG. 13, the operations for seal strip monitoring devices may include assigning, at power-up, a first address to the first seal strip device and then triggering a second seal strip device to obtain a second address, at block 1310. The seal strip location identification components associated with the respective seal strip devices may be electrically connected in series. Referring to FIG. 14, the operations may include transmitting information related to respective currents through respective ones of the seal strip location identification components to a system coordinator circuit, at block 1410, and receiving, by the respective monitoring circuits, respective addresses from the system coordinator circuit related to respective locations of the respective seal strip devices, at block 1420.

According to various embodiments described herein, a group of seal strip devices are able to use a common bus to automatically coordinate their order in a series of PCBs in a seal strip. This is accomplished with a seal strip location identification element and current and location monitoring circuits. Thus, the embodiments described herein may provide a convenient solution that provides simple installation, reduces manufacturing complexity, allows use of common firmware and hardware across different PCBs, does not require training of the operator to properly assign addresses at installation, and/or provides better accuracy in determination of the location of seal strip devices in a seal strip.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art, and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a". "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements, and elements should not be limited by these terms; rather, these terms are only used to distinguish one element from another element. Thus, a first element discussed could be termed a second element without departing from the scope of the present inventive concepts.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry." "a module" or variants thereof.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination. Many variations and modifications can be made to the embodiments without substantially departing from the principles described herein. All such variations and modifications are intended to be included herein within the scope.

The invention claimed is:

1. An electronic device for determining a location of a seal strip device in a strip of a papermaking machine, the electronic device comprising:
   a seal strip location identification component associated with the seal strip device;
   a current monitoring circuit configured to measure a current through the seal strip location identification component that is associated with the seal strip device; and
   a location circuit configured to transmit information related to the current through the seal strip location identification component, and configured to receive an address related to the location of the seal strip device,
   wherein the seal strip location identification component comprises an active microcontroller comprising an input configured to receive state information indicating the address related to the seal strip device and an output that is toggled to control addressing of another active microcontroller.

2. The electronic device of claim 1, wherein the location circuit comprises:
   a transceiver configured to transmit the information related to the current through the seal strip location identification component to a system coordinator circuit, and configured to receive the address related to the location of the seal strip device from the system coordinator circuit.

3. The electronic device of claim 2, further comprising:
   a common bus that is electrically connected to the seal strip location identification component, and
   wherein the information related to the current through the seal strip location identification component is communicated to the system coordinator circuit via the common bus.

4. The electronic device of claim 1, wherein the current monitoring circuit comprises a differential monitoring circuit configured to determine a voltage differential across the seal strip location identification component.

5. The electronic device of claim 1, wherein the seal strip location identification component comprises a passive electrical component.

6. The electronic device of claim 5, wherein the passive electrical component comprises a resistor.

7. The electronic device of claim 1, wherein the location of the seal strip device is configured to be programmed at installation of the strip of the papermaking machine.

8. The electronic device of claim 1, wherein the location of the seal strip device is based on a value of the seal strip location identification component.

9. The electronic device of claim 1, further comprising:
a plurality of seal strip devices comprising the seal strip device; and
a plurality of seal strip location identification components comprising the seal strip location identification component,
wherein the seal strip device comprises a first seal strip device of the plurality of seal strip devices and the seal strip location identification component of the plurality of seal strip location identification components comprises a first seal strip location identification component, and
wherein respective ones of the plurality of seal strip location identification components have different values from one another to indicate unique respective locations of respective ones of the plurality of seal strip devices comprising the seal strip device in the strip.

10. The electronic device of claim 9, wherein the plurality of seal strip location identification components associated with the respective ones of the plurality of seal strip devices are electrically connected in series.

11. The electronic device of claim 10, wherein respective location circuits including the location circuit are associated with the respective ones of the plurality of seal strip devices and are configured to transmit information related to respective currents through respective ones of the plurality of seal strip location identification components to a system coordinator circuit, and
wherein the respective location circuits are configured to receive respective addresses from the system coordinator circuit related to respective locations of the respective ones of the plurality of seal strip devices.

12. The electronic device of claim 11, further comprising:
a common bus that is electrically connected to ones of the plurality of seal strip location identification components, and
wherein the information related to the respective currents through the respective ones of the plurality of seal strip location identification components is communicated to the system coordinator circuit via the common bus.

13. The electronic device of claim 9, at power-up the first seal strip device is assigned a first address and then triggers a second seal strip device of the plurality of seal strip devices to obtain a second address.

14. A method for determining a location of a seal strip device in a strip of a papermaking machine, the method comprising:
determining a current through a seal strip location identification component associated with the seal strip device;
reporting the current through the seal strip location identification component to a system coordinator device;
receiving, from the system coordinator device, an address related to the location of the seal strip device; and
determining the location of the seal strip device based on the address that was received from the system coordinator device.

15. The method for determining the location of the seal strip device of claim 14, further comprising:
a plurality of seal strip devices comprising the seal strip device; and
a plurality of seal strip location identification components comprising the seal strip location identification component,
wherein the seal strip device comprises a first seal strip device of the plurality of seal strip devices and the seal strip location identification component of the plurality of seal strip location identification components comprises a first seal strip location identification component, and
wherein respective ones of the plurality of seal strip location identification components have different values from another to indicate unique respective locations of respective ones of the plurality of seal strip devices comprising the seal strip device in the strip.

16. The method for determining the location of the seal strip device of claim 15, the method further comprising:
at power-up, assigning a first address to the first seal strip device and then triggering a second seal strip device of the plurality of seal strip devices to obtain a second address.

17. The method for determining the location of the seal strip device of claim 15, wherein the plurality of seal strip location identification components associated with the respective ones of the plurality of seal strip devices are electrically connected in series.

18. The method for determining the location of the seal strip device of claim 17, wherein respective location circuits are associated with the respective ones of the plurality of seal strip devices, the method further comprising:
transmitting information related to respective electrical properties of ones of the plurality of seal strip location identification components to a system coordinator circuit, and
receiving, by the respective location circuits, respective addresses from the system coordinator circuit related to respective locations of the respective ones of the plurality of seal strip devices.

19. A seal strip location determination circuit for determining a location of a first seal strip device of a plurality of seal strip devices in a strip of a papermaking machine, the seal strip location determination circuit comprising:
a seal strip identification circuit associated with the first seal strip device of the plurality of seal strip devices;
a current monitoring circuit configured to determine a current through the seal strip identification circuit that is associated with the first seal strip device of the plurality of seal strip devices; and
a location circuit configured to transmit information related to the current through the seal strip identification circuit, and configured to receive an address related to the location of the first seal strip device of the plurality of seal strip devices,
wherein at power-up, the first seal strip device of the plurality of seal strip devices is assigned a first address and then triggers a second seal strip device of the plurality of seal strip devices to obtain a second address.

* * * * *